Jan. 18, 1955

A. W. BAKER ET AL 2,699,938

FEEDING AND HOLD-DOWN MECHANISM FOR
PARTITION ASSEMBLING MACHINES

Original Filed May 7, 1949

Inventors
Arthur W. Baker
George G. Porter
By their Attorneys
Merchant & Merchant United States Patent Office 2,699,938
Patented Jan. 18, 1955

2,699,938
FEEDING AND HOLD-DOWN MECHANISM FOR PARTITION ASSEMBLING MACHINES

Arthur W. Baker, Excelsior, Minn., and George G. Porter, Miami, Fla., assignors to The J. H. Mayhew Company, Excelsior, Minn., a corporation of Minnesota Original application May 7, 1949, Serial No. 91,988. Divided and this application November 24, 1950, Serial No. 197,417

13 Claims. (Cl. 271—44)

This application is filed as a division of our co-pending application for Letters Patent of the United States for "Cell Case Partition Assembling Machine," filed May 7, 1949, under Serial No. 91,988; the invention of our instant application also relating to improvements in machines for assembling cell case partitions into crossed assembled relationship to form cell case cores, which, when placed in suitable cases or containers, divide the interiors of their respective cases or containers into pluralities of compartments to form completed cell cases.

Generally stated, the invention hereof consists of novel devices, combinations of devices, and arrangements of parts hereinafter described and defined. More specifically, it may be stated that the instant invention relates to improvements on and modifications of the machine for like purpose illustrated and broadly claimed in the application of George G. Porter, filed in the United States Patent Office on October 13, 1947, under Serial No. 779,432 and entitled "Cell Case Partition Assembling Machine," now U. S. Patent No. 2,662,453.

An important object of the instant invention is to decrease the cost of production of cell case partition assembling machines of the general character disclosed in the above-identified application.

Another important object of the invention hereof is to increase the accuracy, dependability, and life of machines of the general character disclosed in the aforesaid Porter application.

Still another and primary object of the invention is the provision, in a machine of the class described, of improved partition feeding or dispensing mechanism, whereby the probability of damaging the partitions and/or jamming of the machine is greatly reduced.

The above and numerous other highly important objects and advantages of the invention will be made apparent from the following specification, claims and appended drawings.

In the accompanying drawings, wherein a commercial embodiment of the machine is illustrated, like characters indicate like parts throughout the several view.

Referring to the drawings.

In the drawings there is shown a machine of the type disclosed in detail in the copending applications, Serial Nos. 91,988 and 779,432, now U. S. Patent No. 2,662,453, both mentioned above, which is the type of machine to which the invention claimed in this application is to be used. The details of construction of the partition assembling machine of said application have been deleted from this application in accordance with the examiner's requirement to do so, since the machine as a whole is fully described in applicants' copending applications and that this application refers only to the feeding aspects of the machine.

Figures 1, 2:
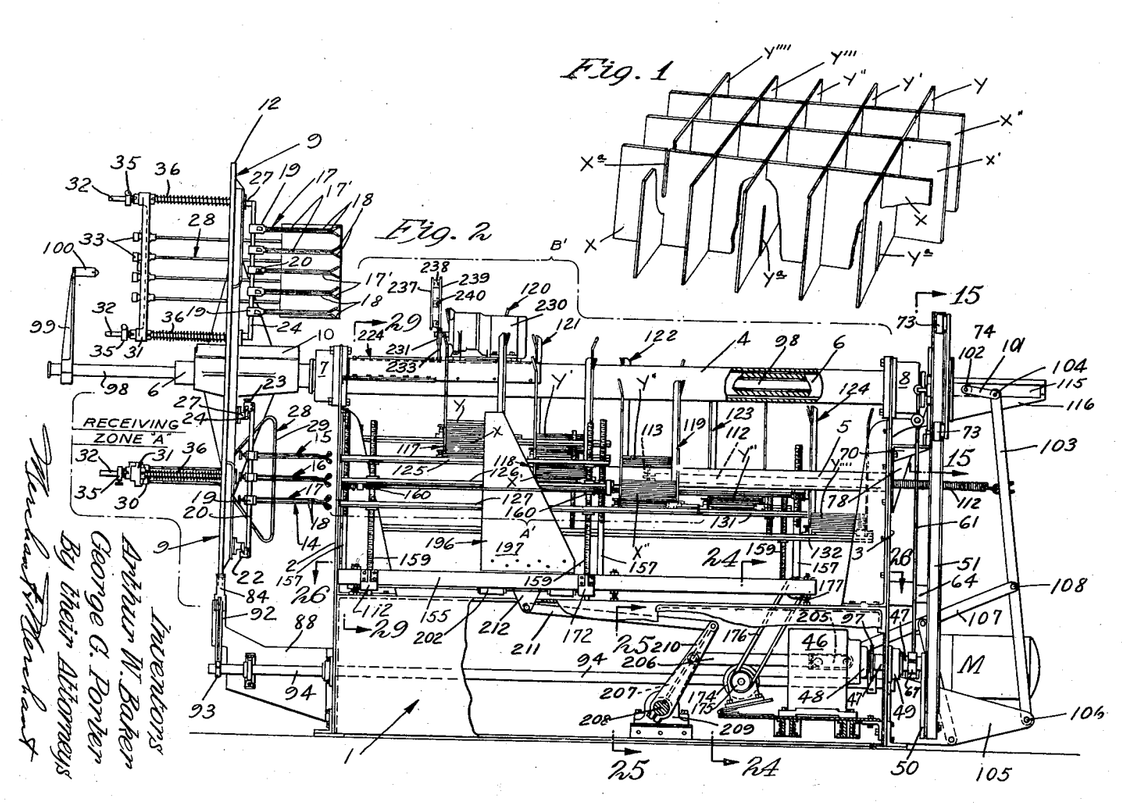
Fig. 1 is a perspective view, with some parts broken away and some parts shown in section, of a completed cell case core assembled, from a plurality of pre-slotted cell case partitions, by the machines of the instant invention.
Fig. 2 is a view in side elevation, with some parts broken away and some parts shown in section, of a commercial form of machine, built in accordance with the invention.

By reference now to Fig. 1, it will be seen that the completed cell case core therein illustrated is made up of a laterally spaced group of pre-slotted cell case partitions X, X' and X", which are in crossed assembled relationship with a laterally spaced group of cell case partitions Y, Y', Y", Y''', and Y''''. The cell case partitions Y' and Y''' are provided with laterally spaced slots Xa for receiving partitions Y, Y', Y", Y''', and Y'''', and the cell case partitions Y, Y', Y", Y''', and Y'''' are formed with slots Ya for receiving partitions X, X' and X", these several parts all being of the conventional pre-slotted variety.

For delivering or feeding cell case partitions X, X', and X" to the sets of holders 15, 16 and 17, respectively, of each group 14 of holders while the latter are respectively indexed in their receiving zone A, we provide a group A' of cell case partition dispensers which are individually indicated as entireties by 117, 118 and 119, respectively; and for delivering or feeding cell case partitions Y, Y', Y", Y''' and Y'''' into positions of crossed assembled relationship with partitions X, X' and X", held by the sets of holders 15, 16 and 17, respectively, of each group of holders 14, while the latter are respectively indexed in an assembly zone or station B, we provide a group B' of cell case partition dispensers which are individually indicated as entireties by 120, 121, 122, 123 and 124. The group A' of dispensers are located immediately rearwardly adjacent the receiving zone A, and the group B' of dispensers are located immediately rearwardly adjacent the assembly zone B. The dispensers 117 to 124, inclusive, each comprise a magazine portion for a stack of cell case partitions and an underlying reciprocating pusher type conveyor mechanism. The bottom of the magazine portion of the dispenser 117 is formed by a table 125, the bottom of the magazine portion of the dispenser 118 is formed by a table 126, the bottom of the magazine portion of the dispenser 119 is formed by a table 127, the bottom of the magazine portion of the dispenser 120 is formed by a table 128, the bottom of the magazine portion of the dispenser 121 is formed by a table 129, the bottom of the magazine portion of the dispenser 122 is formed by a table 130, the bottom of the magazine portion of the dispenser 123 is formed by a table 131, and the bottom of the magazine portion of the dispenser 124 is formed by a table 132. Other parts of the magazine portions of dispensers 117 to 119, inclusive, of dispensers group A' are identical, and other parts of the magazine portions of dispensers 120 to 124, inclusive, of dispenser group B' are substantially identical to those of group A', differing from the former mainly in matters of dimension and spacing of parts and other minor details which will later be made apparent.

Figures 18, 19:
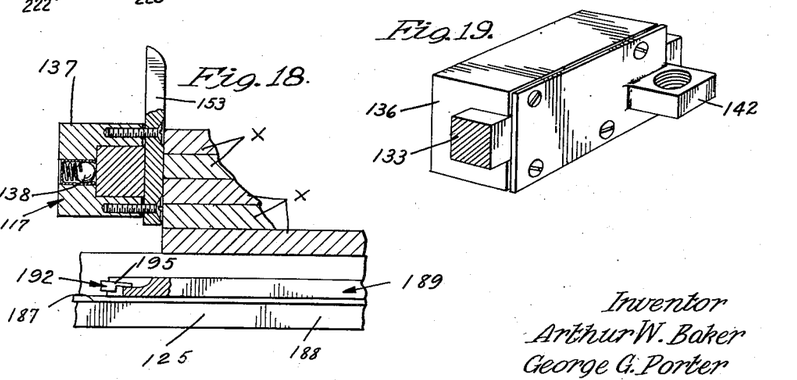
Fig. 18 is a greatly enlarged fragmentary detail view, taken on the line 18—18 of Fig. 16.
Fig. 19 is a greatly enlarged perspective view, with some parts broken away, of certain of the parts shown particularly in Fig. 16.

The magazine portions of the dispensers 117 to 124, inclusive, respectively, each further comprise forwardly and rearwardly extending laterally spaced slide bars or rails 133 mounted on opposite sides of their respective cooperating bottom forming tables 125 to 132, inclusive, respectively (see particularly Figs. 10, 11, 12, 13 and 16). By reference particularly to Figs. 12 and 13, it will be seen that the said guide bars or rails 133 are mounted fast on their respective cooperating tables adjacent their opposite ends through the medium of spacers 134 and anchoring screws 135, so that the intermediate portions of said guide rails or bars 133 are spaced above but are parallel to the upper surfaces of their respective tables. Adjustably slidably mounted on each of the laterally spaced rails or bars 133 are composite slide blocks 136, shown best in Figures 10, 11, 13, 16 and 19. These slide blocks 136, while manually slidable on the bars or rails 133 are internally equipped with friction devices preventing accidental displacement from manually adjusted positions. These friction devices are not specifically shown in connection with slide blocks 136 but may assume to be the same as shown in connection with slide blocks 137, shown in detail in Fig. 18, and which friction devices each comprise a spring pressed ball 138 working against the cooperating guide bar or rail. The opposite slide blocks 136 of each magazine are rigidly connected by a transverse guide bar or rail 139, see particularly Figs. 10, 11, and 16. Slidably mounted on the guide bar or rail 139 of each of the magazines 120 to 124, inclusive, of the dispenser group B' is a single composite slide block 140 which is substantially identical to the slide block 136. In the magazines 117 to 119, inclusive, of dispenser group A', there are three slide blocks 140 slidably mounted on the guide bar 139. By reference particularly to Figs. 10, 11, 13 and 16, it will be seen that the transverse guide bars or rails 139 are anchored fast at opposite ends to opposite slide blocks 136 through the medium of anchoring screws 141 and laterally inwardly projecting anchoring flanges 142 on the inner sides of blocks 136, the anchoring flanges 142 being peculiar to slide blocks 136. Carried by each slide block 140 of dispenser group B' is a flat upright partition guide post 143. Carried by the central guide block 140 of each magazine of dispenser group A' is a T-shaped upright guide post 144, see particularly Fig. 16, and carried by each of the two outside slide blocks 140 of each magazine of dispenser group A' is a flat upright guide post 145. Defining the front of each of the magazines 117 to 124, inclusive, of dispenser groups A' and B' is a transverse guide rail 146 which extends over and in spaced relationship to an underlying upper surface of a cooperating table. These guide rails or bars 146 are mounted fast on their underlying table adjacent their opposite ends through the medium of thumb screws 147 and shim blocks 148, shown in detail in Fig. 17. These shim blocks 148 are formed to provide relatively thin portions 149 and relatively thicker portions 150, the former being provided with an anchoring screw receiving slot 151 and the latter with an anchoring screw receiving slot 152. The spacing of the guide bars 146 from their respective underlying table surfaces may be varied to accommodate the machine to partitions of different thicknesses by merely reversing shim blocks 148 so as to bring their respective thin portions 149 or thicker portions 150 under the opposite ends of the rails 146. Slidably mounted on the guide rails or bars 146 over all magazines of dispenser groups A' and B' are three of the beforementioned slide blocks 137, shown in detail in Fig. 18. Carried by each of the two outside slide blocks 137 of each magazine of dispenser group A' are short flat guide posts 153. Carried by the center guide block 137 of each magazine in dispenser group A' is a tall flat guide post 145. Carried by the central slide block 137 of each magazine in dispenser group B' is a T-shaped upright guide post 154. Carried by each of the outside slide blocks 137 of each magazine in dispenser group B' is a tall flat upright guide post 143. The T-shaped guide posts 144 and 154 provide partition slot engaging flanges 144' and 145', respectively.

The reciprocating pusher type conveyor or dispenser mechanism for each table 125, 126, and 127 and 128–132 inclusive in dispenser group A' and B' comprises an elongated pusher bar 189 located in each of the table guideways or channels 187. The pusher bars 189 of each table are tied together for common forward and rearward reciprocating movements by a transverse tie bar 190 working slidably against the under surface of its respective table and rigidly connected to each pusher bar 189 of its respective table by head-equipped bolts 191 working therethrough and through the table slots 188 and screw-threaded each into an overlying pusher bar 189. Each pusher bar 189 is provided (see particularly Figs. 13, 14 and 15) with a longitudinally spaced plurality of partition-engaging pushing pawls 192, the number of pawls 192 for each pusher bar depends upon the length of the cooperating table, and the spacing between pawls 192 of a common bar 189 being greater than the depth of the deepest partition capable of handling in a cooperating magazine so as to insure definite spacing between successive partitions being fed over a common table. The pawls 192 are intermediately pivoted at 193 and comprise partition-engaging front end portions 194 and weighted rear end portions 195 yieldingly biasing the front end portions 194 into their upper operative positions shown in Fig. 14. By reference to Fig. 14, it will be seen that when the pawls 192 are in their operative positions, their free ends 194 extend above the upper surface of their cooperating tables (tables 128 and others) so that they will engage the rear edges of a partition Y or X, X', X'', Y', Y'', Y''', Y'''', located on respective cooperating tables. The pusher bars 189 of all tables 125–132 inclusive are all subject to continuous forward and rearward reciprocation by mechanism hereinafter described so that the end 194 of the pawl 192 of each pusher bar of each table engages the rear edge of a different partition and imparts a pre-determined step of forward movement to an engaged partition for each reciprocation. The pawls 192 of each table are arranged in laterally aligned groups and the rearmost group of pawls 192 of each table always engages the rear edge of the bottom partition of a stack of partitions X, X', X'', Y, Y', Y'', Y''', or Y'''' contained in its respective cooperating magazine 117, 118, 119, 120, 121, 122, 123, or 124. By reference to Fig. 15, it will be seen that the partition-engaging front ends 194 of the pawls 192 slide under the cooperating partitions (partition Y and others) during the rearward return strokes of the pusher bars 198 and said pawls.

Figures 3, 4:
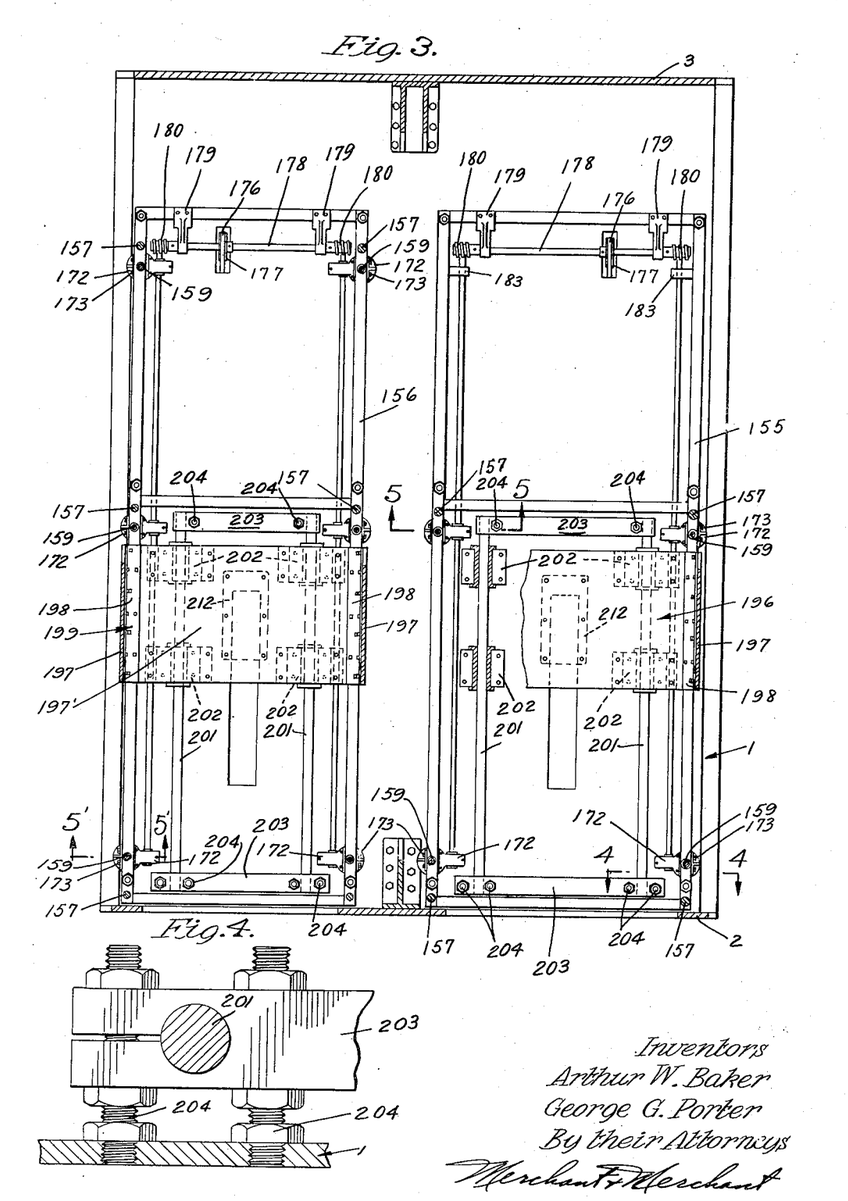
Fig. 3 is a greatly enlarged sectional view, taken on the line 3—3 of Fig. 2.
Fig. 4 is a still further enlarged fragmentary detail view, taken on the line 4—4 of Fig. 3.
Figures 5, 6:
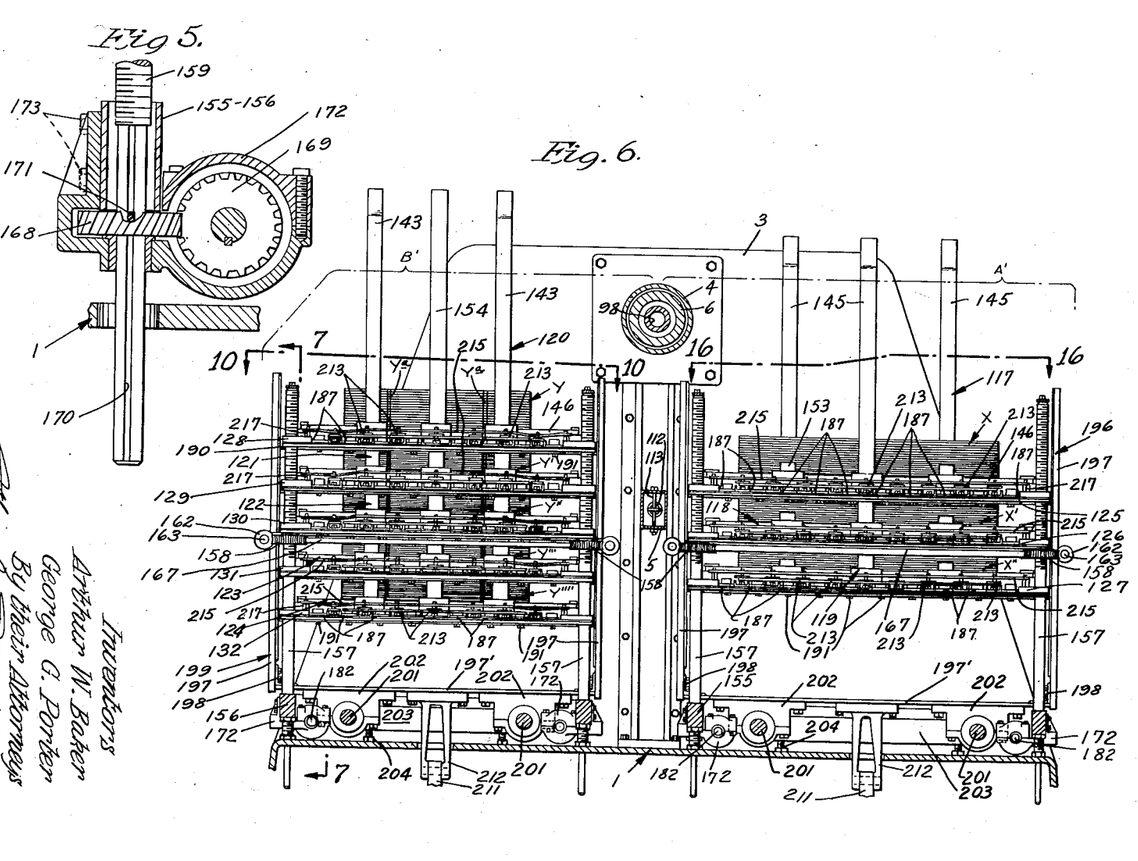
Fig. 5 is a greatly enlarged fragmentary detail view, taken on the line 5—5 and 5'—5' of Fig. 3.
Fig. 6 is an enlarged sectional view, taken on the vertical line 6—6 of Fig. 2.

The transverse tie bars 190 of the three tables 125, 126 and 127 of dispenser group A' are connected for common forward and rearward reciprocating movements by a pusher head 196 comprising laterally spaced vertical head plates 197, which are secured together at their bottom ends by a transverse tie plate 197' and angle irons and bolts 198, shown best in Figs. 3 and 6. The tie bars 190 of tables 128, 129, 130, 131, and 132 of the dispenser group B' are similarly tied together for common forward and rearward reciprocation by a pusher head 199, also comprising laterally-spaced side plates 197 and are secured together at their lower ends by transverse tie plates 197' and bolts and angle irons 198. The head plates 197 define opposed vertical guideways 200, which receive opposite free end portions of the tie bars 190 (see Figs. 10 to 13 inclusive). The free ends of the tie bars 190 are slidable in their respective cooperating guideways 200, so that all of the tie bars 190 of dispenser group A' will be connected to the respective heads 196 or 197 for common forward and rearward reciprocation, while leaving the individual tables free for independent vertical adjustments therein. The pusher heads 196 and 199 are each mounted for forward and rearward reciprocation in parallel relation to their respective cooperating tables by means of a laterally spaced forwardly and rearwardly pair of guide rods 201 and split bearing blocks 202 of which there are two for each rod 201, and which, bearing blocks, are anchored to the undersides of tie plates 197' (see particularly Figs. 3 and 6). Each pair of rails 201 is rigidly mounted on the base frame 1 by means of anchor bars 203 and anchor bolts 204. The pusher heads 196 and 199 are reciprocated in common from the slow-speed power shaft 43 through power transmission connections comprising a crank 205 fast on one projected end of shaft 43, a pitman arm 206 driven by crank 205, and a rock arm 207 fast on a rock shaft 208. The rock shaft 208 extends transversely of the machine and is journalled adjacent its ends to the main base frame 1 in spaced bearing brackets 209, and carries for common rocking movements therewith a pair of like cranks 210, one of which is connected to pusher head 196 by a pitman arm 211 and bracket 212, and the other of which is connected to pusher head 199 by a corresponding pitman arm 211 and corresponding bracket 212.

For the purpose of holding partitions X, X', X'', Y, Y', Y'', Y''', and Y'''' in face to face contact with the underlying surfaces of tables 125 to 132, inclusive, respectively, during their feeding movements thereover, we provide yielding hold-down mechanism as follows: This yielding hold-down mechanism for each of the several tables comprises a plurality of laterally-spaced parallel hold-down shoes 213 for each table 125 to 132, inclusive, respectively. These elongated hold-down shoes normally bear upon the uppermost surfaces of tables 125 to 132, inclusive, respectively, intermediate the guide channels 187 of said tables and extend longitudinally of the machine from points immediately forwardly of the magazines 117 to 124, inclusive, respectively, approximately to the front extremities of the respective cooperating tables (see particularly Figs. 6, 10 and 12). At their rear ends adjacent their respective cooperating machines, the elongated hold-down shoes 213 are upturned at 214 (see Figs. 12 and 14) to facilitate insertion of partitions therebetween and the uppermost surfaces of the tables. The hold-down shoes 213, being subject to the yielding action of gravity, bear upon the partitions during their forward movements through the magazines to their points of delivery, and keep the same firmly pressed against the underlying uppermost surfaces of the tables, thereby insuring constant engagement of the rear edges of the partitions with the front ends 194 of pusher pawls 192. The several hold-down shoes 213 of each of the tables are anchored to their respective table and to one another at their front end portions by a common transverse anchoring strap 215, and adjacent their rear end portions by a common transverse anchoring bar 216. The anchoring straps 215 are flexible and elastic, being preferably made of rubber, synthetic rubber or the like, and the anchoring bars 216 are of metal and are relatively rigid. The elastic straps 215 extend transversely over the several cooperating hold-down shoes 213 and are anchored at their opposite end portions to an underlying table by a rivet or the like, as at 217, and are anchored to each of the several underlying hold-down shoes 213 by a rivet or the like 219. The hold-down bars 216 similarly extend transversely across and span the several cooperating hold-down shoes 213 and are anchored at their opposite end portions to an underlying table by shoulder anchoring pins 218, and are anchored to each of the several underlying hold-down shoes by an upstanding anchoring post 220. The anchoring bars 216 are gravity seated on the shoulders of the anchoring pins 218, which maintain said bars spaced above the underlying shoes 213. The hold-down shoe-carried anchoring pins 220 vertically float in suitable receiving orifices in the bars 216 so that the rear ends of the shoes 213 are free for independent vertical movements, one with respect to the other. Of course, with the structure described, the bars 216 positively anchor the hold-down shoes 213 against movements in a horizontal plane while allowing limited independent movements of the rear end portions of the shoes, and the elastic anchoring straps 215, being relieved of excessive strain in a horizontal direction by the bars 216, maintain the front end portions of the hold-down shoes 213 against excessive movements in a horizontal plane, while leaving the front ends of said hold-down shoes 213 free for relatively great upward and downward movements, one with respect to the other. This manner of anchoring the hold-down shoes has been found to be very important in a machine of this kind, which very often works with paper partitions that are subject to imperfections, sometimes resulting in a tendency to produce a jamming or bunching-up of paper under the hold-down shoes. When this happens, the hold-down shoes, mounted as described, and particularly the front end portions of said shoes, are free to move upwardly to relieve the strain, and may be readily lifted for the purpose of removing the material causing the disturbance.

To positively prevent rearward movements of the partitions during intermittent rearward movements of the pusher bars 89 and their pawls 192, we provide anti-reversing mechanism as follows: The said anti-reversing mechanism for each table comprises at least one partition-engaging pawl 221 yieldingly carried by the hold-down shoe 213 of each of the several tables. The pawls 221 (see particularly Figs. 10, 12 and 16) work downwardly through suitable apertures 222, and are each yieldingly mounted on a cooperating hold-down shoe 213 by means of a leaf-mounting spring 223. The leaf-mounting springs 223 extend longitudinally of their respective cooperating hold-down shoes 213 and are anchored fast thereto adjacent their front end portions, but are otherwise free of their respective cooperating hold-down shoes for upward movements with respect thereto, the pawls 221 being mounted fast on the undersurfaces of rear end portions of the leaf springs 223. In their normal downward positions, (shown by full lines in Figs. 12 and 14), the pawls extend below the uppermost surfaces of their respective cooperating tables 125 to 132, inclusive, respectively, and said pawls are beveled at their surfaces to facilitate sliding movements thereunder, in a forward direction, of partitions X, X', X'', Y, Y', Y'', Y''', and Y''''. The pawls 221 are so located longitudinally of their respective cooperating hold-downs, and with respect to the partition-engaging front end portions 194 of pusher pawls 192, that they will drop in behind the partitions at the end of each forward impulse over the table (see for example Figs. 12 and 14). Each of the tables 125 to 132, inclusive, is equipped with a laterally aligned set of anti-reversing pawls 221 for each partition lying on that table forwardly of the magazine of that table, between intermittent forward feeding impulses. Hence, since the various tables vary in length, the number of sets of anti-reversing pawls 121 will vary accordingly.

Located adjacent the ejector zone C is a power-driven endless conveyor 224, which is positioned to receive completed assembed cell case cores of the general character shown in Fig. 1 from the group of holders 14 located in the said ejector zone C. This endless conveyor 224 comprises a wide endless conveyor belt 225 running over a power-driven roller 226 and an idling roller 227, the former being journalled in bearings 228, and the latter in bearings 229. The power driven roller 226 is driven from an electric motor 230 through power transmission mechanism comprising a pulley 231 on the shaft of motor 230, a pulley 232 fast on the shaft of roller 226, and a belt 233 running over said pulleys. In the arrangement illustrated, the endless conveyor 224 delivers to a suitable delivery chute 234.

Figures 7, 8:
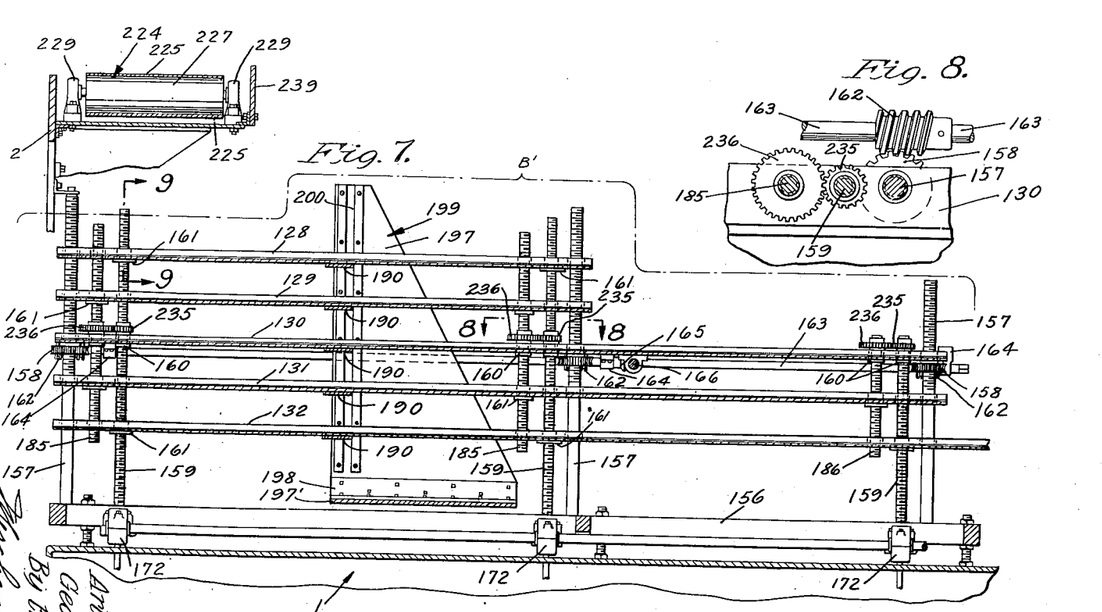
Fig. 7 is a sectional view, taken on the line 7—7 of Fig. 6.
Fig. 8 is a greatly enlarged fragmentary detail sectional view, taken on the line 8—8 of Fig. 7.
Figure 9:
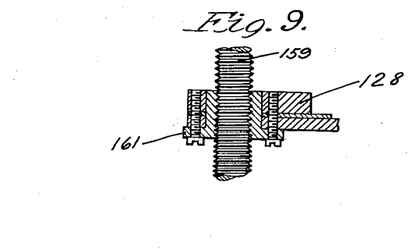
Fig. 9 is a greatly enlarged fragmentary sectional view, taken on the line 9—9 of Fig. 7.
Figure 10:
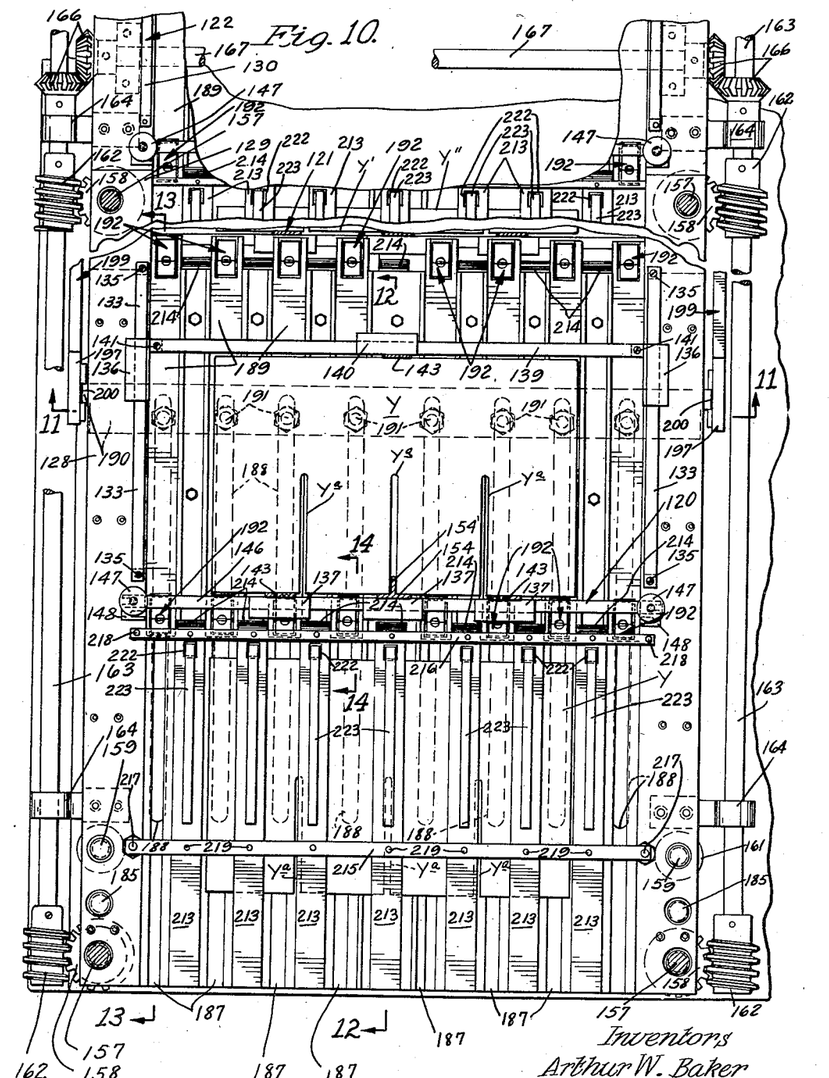
Fig. 10 is a greatly enlarged detail view, some parts broken away, taken on the horizontal line 10—10 of Fig. 6, and looking downwardly.
Figure 11:
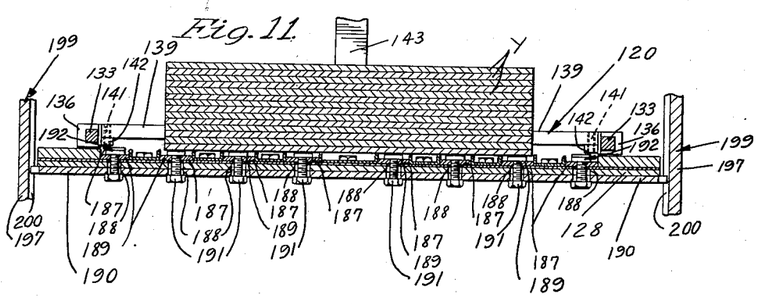
Fig. 11 is a sectional view, taken on the line 11—11 of Fig. 10.
Figure 12:
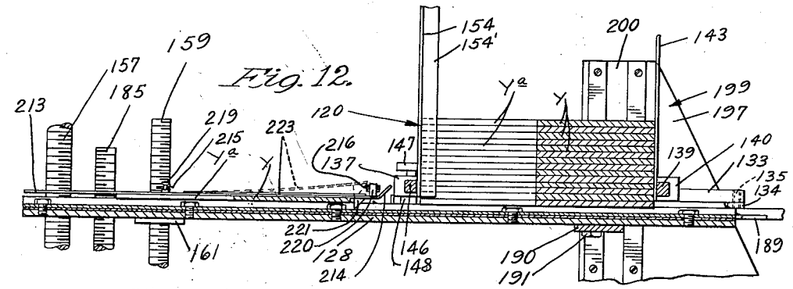
Fig. 12 is a fragmentary sectional view, taken on the line 12—12 of Fig. 10.
Figures 13, 14, 15:
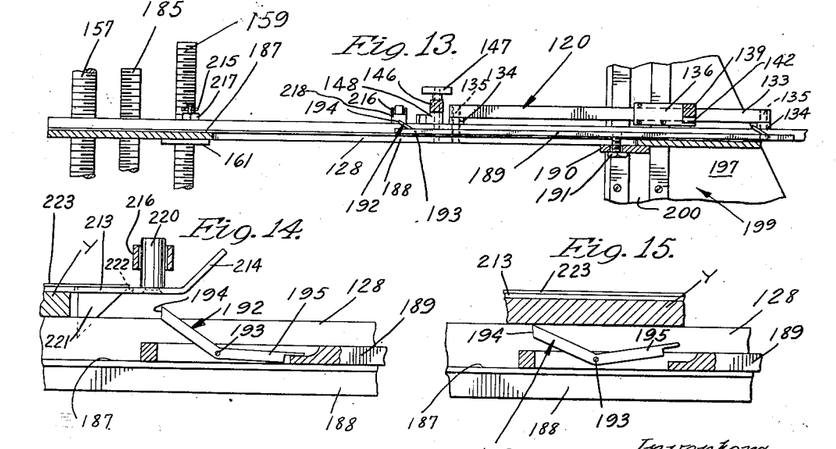
Fig. 13 is a fragmentary sectional view, taken on the line 13—13 of Fig. 10.
Fig. 14 is a greatly enlarged detail fragmentary sectional view, taken on the line 14—14 of Fig. 10, with some parts omitted.
Fig. 15 is a view corresponding to Fig. 14, but showing another position of the parts.
Figures 16, 17:
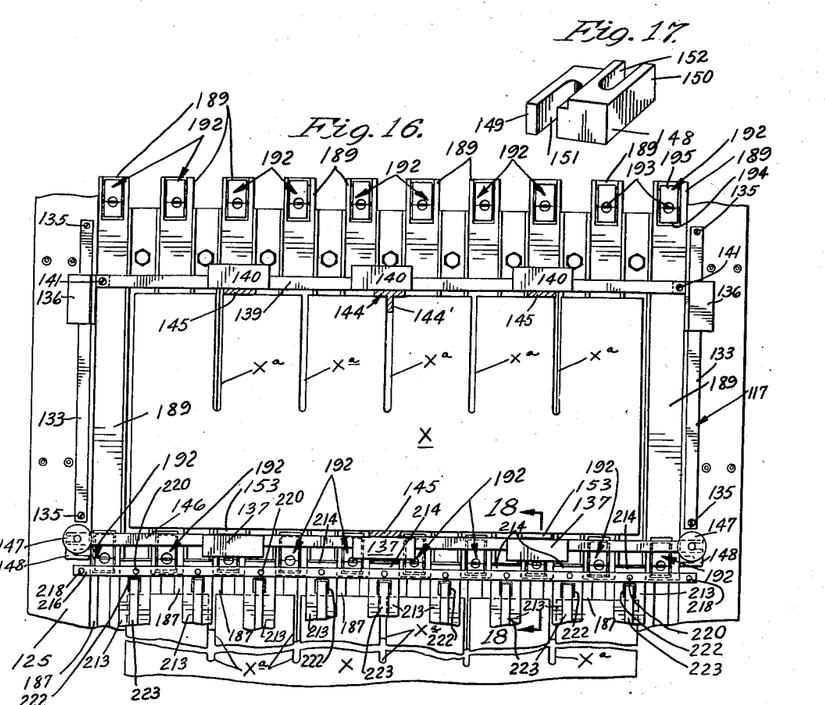
Fig. 16 is a greatly enlarged fragmentary sectional view, taken on the horizontal line 16—16 of Fig. 6.
Fig. 17 is a greatly enlarged detail perspective view of one of the parts of the machine.

Extending parallel to the plane of the front ends of partition holders of group 14 thereof, located in the ejector zone C and parallel to the plane of the longitudinal edge of the conveyor belt 225, and located somewhat above the plane of the upper surface of the latter, is an adjustable back-stop 237 which is engaged by completed cell case core assemblies as they are ejected from the holders in the ejector zone C during their passage by gravity from the holders to the surface of the conveyor belt 225. This back-stop is mounted for adjusting movements toward and from the vertical plane of the free ends of the group of holders 14 on the ejector zone C to accommodate partitions of varying depths, and is so adjusted as to prevent tipping of the completed cell case core assemblies and insure proper location thereof upon the belt. The adjustable mountings for this back-stop 237 comprises parallel pivoted links 238 connected respectively to the back-stop 237 and a main frame supported bracket structure 239 through the medium of fixed pivots. By reference particularly to Fig. 8, it will be seen that the back-stop may be adjusted in a horizontal plane by merely swinging the arms or links 238. By reference also to Fig. 8, it will be seen that the adjustable back-stop 237 may be retained in any desired adjusted position by means of an adjusting link 240 connected to the back-stop 237 by a fixed pivot at one end and pivotally connected at its other end to a set screw-equipped slide block 241 slidably mounted on a guide bar 242.

What we claim is:

1. In a cell case partition assembling machine, partition dispensing mechanism of the reciprocating pusher type comprising a fixed structure defining generally horizontal surfaces on which partitions are supported and over which they are fed, a reciprocatory slide guided in said fixed structure for forward and rearward sliding movements generally parallel to but below the partition-supporting surfaces of said structure, mechanism for imparting such forward and rearward movements to said slide, a pusher pawl mounted on the slide for extending and retracting movements respectively into and out of the path of travel of partitions fed thereby over the partition supporting surfaces of the fixed structure, a partition hold-down shoe disposed above the plane of the said partition supporting surfaces and adapted to engage the upper surfaces of partitions subject to feeding movements thereover, and means anchoring said hold-down shoe against movements in a horizontal plane while allowing free limited upward and downward movements thereof, said means comprising a flexible anchoring strap transversely spanning said hold-down shoe and anchored at its opposite ends to the fixed structure and at its intermediate portion to said hold-down shoe.

2. In a cell case partition assembling machine, partition dispensing mechanism of the reciprocating pusher type comprising a fixed structure defining generally horizontal surfaces on which partitions are supported and over which they are fed, a reciprocatory slide guided in said fixed structure for forward and rearward sliding movements generally parallel to but below the partition-supporting surfaces of said structure, mechanism for imparting such forward and rearward movements to said slide, a pusher pawl mounted on the slide for extending and retracting movements respectively into and out of the path of travel of partitions fed thereby over the partition-supporting surfaces of the fixed structure, a partition hold-down shoe disposed above the plane of the said partition supporting surfaces and adapted to engage the upper surfaces of partitions subject to feeding movements thereover, and means anchoring said hold-down shoe against movements in a horizontal plane while allowing free limited upward and downward movements thereof, said means comprising an elastic anchoring strap transversely spanning said hold-down shoe and anchored at its opposite ends to the fixed structure and at its intermediate portion to said hold-down shoe.

3. The structure defined in claim 1 in which there is a laterally spaced parallel plurality of said hold-down shoes all extending generally in the direction of partition feed, and in which the hold-down shoe anchoring means comprises a flexible strap spanning said plurality of hold-down shoes and anchored at its opposite ends to said fixed structure and at its intermediate portion to each of said shoes.

4. In a cell case partition assembling machine, partition dispensing mechanism of the reciprocating pusher type comprising a feed table over which partitions are adapted to be fed, said table defining forwardly and rearwardly extending guideways intermediate said partition supporting surfaces, a pusher bar mounted for forward and rearward sliding movements in each of said guideways and being disposed below the plane of the partition supporting surfaces of said table, mechanism for imparting forward delivery movements and rearward retracting movements in unison to said pusher bars, one-way acting pusher devices carried by said pusher bars and mounted thereon for extending and retracting movements respectively above and below the plane of the partition supporting surfaces of said table, a hold-down shoe disposed above the plane of the partition engaging surfaces of the table, and means for anchoring said hold-down shoe against movements in a horizontal plane while allowing freedom thereof for limited vertical movements, said anchoring means comprising a flexible strap transversely spanning said hold-down shoe and anchored at its ends to said table and at its intermediate portion to said hold-down shoe.

5. In a cell case partition assembling machine, partition dispensing mechanism of the reciprocating pusher type comprising a feed table over which partitions are adapted to be fed, said table defining forwardly and rearwardly extending guideways intermediate said partition supporting surfaces, a pusher bar mounted for forward and rearward sliding movements in each of said guideways and being disposed below the plane of the partition supporting surfaces of said table, mechanism for imparting forward delivery movements and rearward retracting movements in unison to said pusher bars, one-way acting pusher devices carried by said pusher bars and mounted thereon for extending and retracting movements respectively above and below the plane of the partition-supporting surfaces of said table, a hold-down shoe disposed above the plane of the partition engaging surfaces of the table, and means for anchoring said hold-down shoe against movements in a horizontal plane while allowing freedom thereof for limited vertical movements, said anchoring means comprising an elastic strap transversely spanning said hold-down shoe and anchored at its ends to said table and at its intermediate portion to said hold-down shoe.

6. In a cell case partition assembling machine, partition dispensing mechanism of the reciprocating pusher type comprising a feed table over which partitions are adapted to be fed, said table defining forwardly and rearwardly extending guideways intermediate said partition supporting surfaces, a pusher bar mounted for forward and rearward sliding movements in each of said guideways and being disposed below the plane of the partition supporting surfaces of said table, mechanism for imparting forward delivery movements and rearward retracting movements in unison to said pusher bars, one-way acting pusher devices carried by said pusher bars and mounted thereon for extending and retracting movements respectively above and below the plane of the partition-supporting surfaces of said table, a laterally-spaced plurality of elongated hold-down shoes disposed above the plane of the partition-engaging surfaces of the table, and means anchoring said hold-down shoes against movements in a horizontal plane while allowing free limited upward and downward movements thereof, said anchoring means comprising a flexible hold-down strap transversely spanning the plurality of hold-down shoes and anchored at its ends to the table and at its intermediate portion to each of the several hold-down shoes.

7. The structure defined in claim 6 in which the said flexible hold-down shoe anchoring strap is also elastic.

8. In a cell case partition assembling machine, partition dispensing mechanism of the reciprocating pusher type imparting step by step forward movement to partitions in a generally horizontal plane, a partition hold-down shoe disposed above the plane of said reciprocatory dispensing mechanism and adapted to engage the upper surfaces of partitions subject to feeding movements, means anchoring said hold-down shoe against horizontal movements while allowing limited free upward and downward movements thereof, and an anti-direction reversing device mounted on said hold-down shoe with freedom for movements with respect thereto into and out of the path of travel of partitions and being yieldingly biased in the direction of said path.

9. In a cell case partition assembling machine, a fixed structure defining generally horizontal surfaces on which partitions are supported and over which they are fed, mechanism for imparting step by step forward movements to partitions over the partition-supporting surfaces of the fixed structure, a partition hold-down shoe disposed above the plane of the said partition supporting surfaces and adapted to engage the upper surfaces of partitions subject to feeding movements thereover, and means anchoring said hold-down shoe against movements in a horizontal plane while allowing free limited upward and downward movements thereof, said means comprising a flexible anchoring strap transversely spanning said hold-down shoe and anchored at its ends to the fixed structure and at its intermediate portion to said hold-down shoe.

10. The structure defined in claim 9 in which the said flexible anchoring strap is also elastic.

11. The structure defined in claim 9 in which there are a laterally spaced plurality of said hold-down shoes all extending generally in the direction of partition feed and in which the said flexible anchoring strap spans the said plurality of hold-down shoes and is anchored at its opposite ends to the fixed structure and at its intermediate portion to each of said hold-down shoes.

12. The structure defined in claim 9 in which there are a laterally spaced plurality of hold-down shoes all extending generally in the direction of partition feed and in which said flexible anchoring strap is also elastic and spans the said plurality of hold-down shoes and is anchored at its opposite ends to the fixed structure and at its intermediate portion to each of said hold-down shoes.

13. The structure defined in claim 9 in further combination with an anti-direction reversing device mounted on said hold-down shoe with freedom for movements into and out of the path of travel of the partitions.

References Cited in the file of this patent

UNITED STATES PATENTS

| | | |
|---|---|---|
| 538,403 | Belknap | Apr. 30, 1895 |
| 1,110,810 | McDonald | Sept. 15, 1914 |
| 1,236,054 | Clark | Aug. 7, 1917 |
| 1,365,853 | Roberts | Jan. 18, 1921 |
| 1,807,843 | Hendrickson | June 2, 1931 |
| 1,917,359 | Cameron | July 11, 1933 |
| 2,409,631 | Jones | Oct. 22, 1946 |